United States Patent
Nakashima et al.

(10) Patent No.: US 8,950,928 B2
(45) Date of Patent: Feb. 10, 2015

(54) QUICK-SETTING ADMIXTURE AND SPRAYING METHOD USING IT

(75) Inventors: Yasuhiro Nakashima, Itoigawa (JP);
Youhei Yamagishi, Itoigawa (JP);
Shunichi Mishima, Itoigawa (JP); Isao Terashima, Itoigawa (JP)

(73) Assignee: Danki Kagaku Kogyo Kabushiki Kaisha, Tokyo (JP)

( * ) Notice: Subject to any disclaimer, the term of this patent is extended or adjusted under 35 U.S.C. 154(b) by 1006 days.

(21) Appl. No.: 12/447,472

(22) PCT Filed: Nov. 7, 2007

(86) PCT No.: PCT/JP2007/071662
§ 371 (c)(1),
(2), (4) Date: Apr. 28, 2009

(87) PCT Pub. No.: WO2008/056716
PCT Pub. Date: May 15, 2008

(65) Prior Publication Data
US 2010/0072294 A1    Mar. 25, 2010

(30) Foreign Application Priority Data

Nov. 9, 2006  (JP) ................................ 2006-304597
Jul. 19, 2007  (JP) ................................ 2007-188759

(51) Int. Cl.
*B05D 1/02* (2006.01)
*C04B 7/06* (2006.01)
(Continued)

(52) U.S. Cl.
CPC .............. *C04B 28/02* (2013.01); *C04B 40/0039* (2013.01); *E04F 21/12* (2013.01); *C04B 2103/12* (2013.01); *C04B 2111/00146* (2013.01)

USPC .............. 366/3; 106/724; 106/727; 106/278; 106/772; 427/427; 427/427.1

(58) Field of Classification Search
USPC .............. 239/1; 106/640, 692, 695, 772, 724, 106/727, 728; 366/6, 3; 427/427, 427.1
See application file for complete search history.

(56) References Cited

U.S. PATENT DOCUMENTS 2,231,489 A * 2/1941 Anderson et al. ................ 366/11
2,543,517 A * 2/1951 Anderson ...................... 239/602
(Continued)

FOREIGN PATENT DOCUMENTS

JP          60-4149         2/1985
JP          62-191454       8/1987
(Continued)

OTHER PUBLICATIONS

Translation of Written Opinon of the ISA for PCT/JP2007/0711662, form PCT/ISA237, May 2009, 8 pages.*
(Continued)

*Primary Examiner* — Tony G Soohoo
(74) *Attorney, Agent, or Firm* — Oblon, Spivak, McClelland, Maier & Neustadt, L.L.P.

(57) ABSTRACT

A slurry quick-setting admixture comprising an alkaline earth metal carbonate, a water-soluble acidic substance, calcium aluminate, an alkali metal sulfate, and water; and a quick-setting cement concrete comprising such a slurry quick-setting admixture and cement concrete. The slurry quick-setting admixture may further contain calcium sulfate, calcium hydroxide and/or aluminum hydroxide, a retarder, etc. The spraying method comprises mixing water and a powder quick-setting admixture comprising an alkaline earth metal carbonate, a water-soluble acidic substance, calcium aluminate and an alkali metal sulfate, to form a slurry quick-setting admixture, mixing this slurry quick-setting admixture with cement concrete to form a quick-setting cement concrete, and spraying this quick-setting cement concrete.

22 Claims, 2 Drawing Sheets

(51) Int. Cl.
*C04B 28/02* (2006.01)
*C04B 40/00* (2006.01)
*E04F 21/12* (2006.01)
*C04B 103/12* (2006.01)
*C04B 111/00* (2006.01)

(56) References Cited

U.S. PATENT DOCUMENTS

| | | | | |
|---|---|---|---|---|
| 2,577,664 | A | * | 12/1951 | Pro ................................ 366/11 |
| 3,669,417 | A | * | 6/1972 | Cornwell ......................... 366/5 |
| 3,881,688 | A | * | 5/1975 | Senn ........................ 366/173.2 |
| 4,084,981 | A | * | 4/1978 | Higuchi et al. ............... 106/671 |
| 4,095,748 | A | * | 6/1978 | Ohtake et al. .............. 239/419.3 |
| 4,190,454 | A | * | 2/1980 | Yamagisi et al. ............. 106/695 |
| 4,263,346 | A | * | 4/1981 | Sandell ......................... 427/196 |
| 4,326,560 | A | * | 4/1982 | Drudy ........................... 137/897 |
| 4,452,635 | A | * | 6/1984 | Noshi et al. .................. 106/628 |
| 4,721,659 | A | * | 1/1988 | Tieckelmann et al. ........ 428/701 |
| 4,741,782 | A | * | 5/1988 | Styron ........................... 588/257 |
| 4,844,340 | A | * | 7/1989 | Miyata et al. ..................... 239/9 |
| 4,904,503 | A | | 2/1990 | Hilton et al. |
| 4,931,098 | A | * | 6/1990 | Danielssen et al. ........... 106/638 |
| 5,160,376 | A | * | 11/1992 | Kikuchi et al. ............... 106/819 |
| 5,246,163 | A | * | 9/1993 | Amano et al. ..................... 239/1 |
| 5,273,579 | A | * | 12/1993 | Tanaka et al. ................. 106/715 |
| 5,275,655 | A | * | 1/1994 | Grunau et al. ................. 106/696 |
| 5,641,584 | A | * | 6/1997 | Andersen et al. ............. 428/703 |
| 7,618,490 | B2 | * | 11/2009 | Nakashima et al. .......... 106/724 |
| 7,662,230 | B2 | * | 2/2010 | Angelskaar et al. .......... 106/819 |
| 2002/0124773 | A1 | * | 9/2002 | Diesso ............................ 106/35 |
| 2004/0255825 | A1 | | 12/2004 | Angelskaar |
| 2007/0005459 | A1 | * | 1/2007 | Fowler ............................ 705/28 |
| 2007/0044686 | A1 | * | 3/2007 | Angelskaar ................... 106/727 |
| 2007/0056473 | A1 | * | 3/2007 | Nakashima et al. .......... 106/627 |
| 2010/0072294 | A1 | * | 3/2010 | Nakashima et al. .............. 239/1 |

FOREIGN PATENT DOCUMENTS

| | | |
|---|---|---|
| JP | 9-19910 | 1/1997 |
| JP | 10-87358 | 4/1998 |
| JP | 11-79818 | 3/1999 |
| JP | 2000-302505 | 10/2000 |
| JP | 2000 302506 | 10/2000 |
| JP | 2001-302323 | 10/2000 |
| JP | 2001-130935 | 5/2001 |
| JP | 2001-509124 | 7/2001 |
| JP | 2001-270768 | 10/2001 |
| JP | 2002-47048 | 2/2002 |
| JP | 2002-80250 | 3/2002 |
| JP | 2002 220270 | 8/2002 |
| JP | 2003-321363 | 11/2003 |
| JP | 2004-35387 | 2/2004 |
| JP | 2005 503991 | 2/2005 |
| JP | 2007-119263 | 5/2007 |
| WO | WO 99/64232 * | 11/1999 |
| WO | 2005 019131 | 3/2005 |
| WO | WO 2005/028398 A * | 3/2005 |

OTHER PUBLICATIONS

Extended Search Report issued Jan. 24, 2012 in Europe Application No. 07831393.9.

* cited by examiner

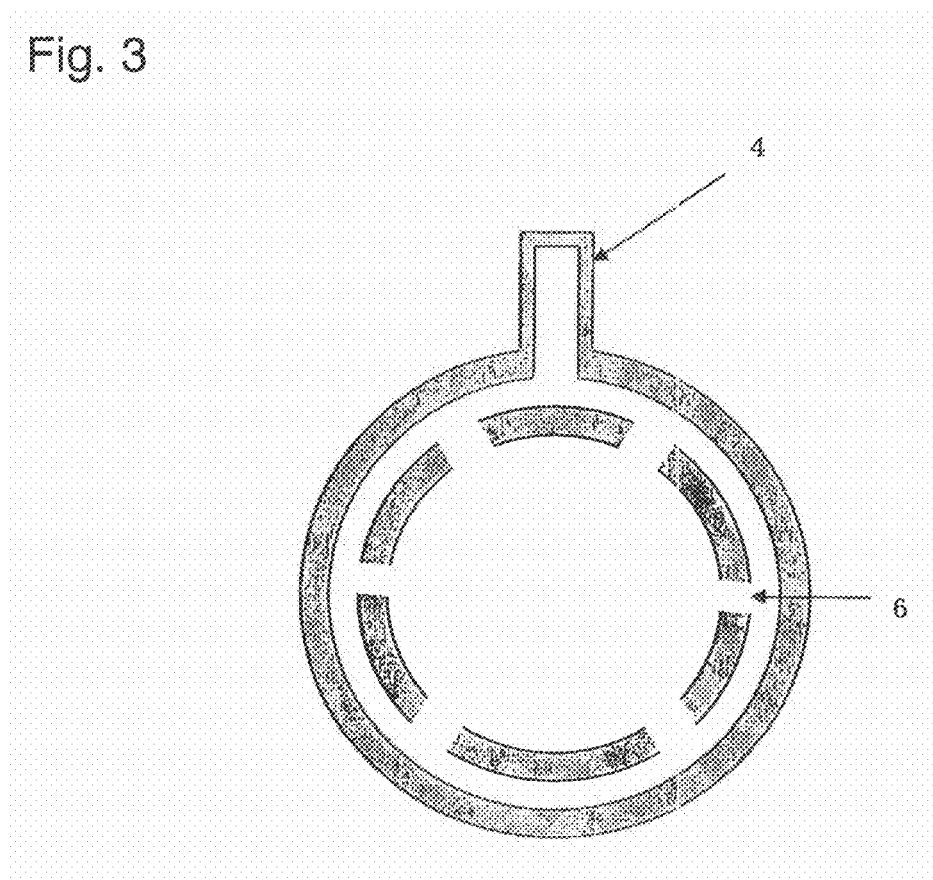

QUICK-SETTING ADMIXTURE AND SPRAYING METHOD USING IT

CROSS-REFERENCE TO RELATED APPLICATIONS

This application is a 371 of PCT/JP07/071,662 filed Nov. 7, 2007 and claims the benefit of JP 2006-304597 filed Nov. 9, 2006 and JP 2007-188759 filed Jul. 19, 2007.

TECHNICAL FIELD

The present invention relates to a quick-setting admixture for spraying or a spraying material to be used for exposed wall surfaces at slopes, pits, underground spaces or tunnels such as road tunnels, railway tunnels or channel tunnels, and a spraying method using it.

BACKGROUND ART

Heretofore, methods of spraying a quick-setting concrete obtained by mixing a concrete with a powder is quick-setting admixture were employed to prevent break and fall of ground exposed in excavation works of tunnels or the like (cf. Patent Document 1 and 2).

As the quick-setting admixture for such spraying methods, one having an alkali metal aluminate, an alkali metal carbonate or the like admixed with calcium aluminate was used, as it was excellent in the quick-setting property.

However, there has been an increasing demand for a quick-setting admixture having a pH-value lower than that of the quick-setting admixture having an alkali metal aluminate, an alkali metal carbonate or the like admixed with calcium aluminate, and being weakly alkaline to acidic, preferably neutral or weakly acidic.

Further, as a tool to add the quick-setting admixture to concrete, it was common to use a Y-tube. In such a case, in order to increase the mixing efficiency, it was common to employ a method wherein concrete was once disintegrated by means of compressed air and then the quick-setting admixture was added. As a result, the amount of compressed air to be used for spraying tended to increase, and the amount of dust formed tended to increase sometimes. Accordingly, at the time of spraying, it was necessary to take some measure to cope with such dust.

In order to solve such problems, as a liquid quick-setting admixture, one containing a basic aluminum salt or an organic carboxylic acid as the main component (Patent Document 3), one containing aluminum sulfate or an alkanolamine as the main component (Patent Document 4), or one containing a basic aqueous solution of aluminum, and lithium silicate and lithium aluminate as the main components (Patent Document 5) was, for example, used.

However, with this liquid quick-setting admixture, the initial strength was hardly obtainable, and as compared with a conventional powder quick-setting admixture, there was a danger of falling when sprayed thickly in a tunnel.

In order to solve such problems, a technique was developed to mix water to a quick-setting admixture comprising calcium aluminate and aluminum sulfate to form a slurry, which was added to concrete (Patent Documents 6, 7 and 8).

This technique is to reduce a damage by alkali reagents by a combined use of aluminum sulfate and calcium aluminate. Further, it is a technique to attain a low dusting property by mixing the powder quick-setting admixture with water to form a slurry. Further, these patent documents describe about an AE agent and a blowing agent, but they are mentioned as substances to reduce the amount of dust by adding them preliminarily to concrete, and there is no mention about using a blowing agent in a quick-setting admixture.

As a tool to add such a slurry quick-setting admixture to concrete, a Y-tube or a showering ring to add a quick-setting admixture in the form of a shower into a concrete piping, was, for example, used.

In the case of the Y-tube, in order to improve the mixing property, a technique was used to once disintegrate concrete by means of compressed air and then add the quick-setting admixture, and as a result, the amount of compressed air used for spraying tended to increase, and the amount of dust formed tended to increase sometimes.

On the other hand, in a case where the showering tube is used, the mixing property of the slurry quick-setting admixture and concrete will be good, whereby low dust spraying will be possible without requiring air for disintegration. On the other hand, the structure is complicated, and the frequency of solidification of the slurry inside was more than the case of Y-tube, whereby the showering tube was not practically useful.

Accordingly, in spraying by means of a showering tube, a liquid quick-setting admixture is mainly used, but the components of a liquid quick-setting admixture are only components to accelerate a hydration reaction of cement and do not have a self-curing property whereby they are cured by themselves to impart a quick-setting property. Thus, there was a problem that it was inferior in the quick-setting property as compared with a slurry quick-setting admixture containing calcium aluminate.

As a liquid quick-setting admixture having the quick-setting property more improved than ever, one having a fluorine element incorporated to aluminum sulfate was developed (Patent Documents 9, 10 and 11).

However, for practical application, further improvement of the quick-setting property, improvement of the adhesive property at a spring water area, etc. have been desired.

Further, a technique for combining a liquid quick-setting admixture and a powder quick-setting admixture has also been published (Patent Documents 12 and 13). However, in a case where at the time of spraying, a liquid quick-setting admixture and a powder quick-setting admixture are mixed to form a slurry, there has been a case where the slurry undergoes solidification in the same manner as the above-mentioned slurry quick-setting admixture. Accordingly, it has been desired that the slurry will not solidify at the portion of the quick-setting admixture-adding tool and that the replacing cycle of such a tool is long.

Further, a technique of adding a liquid quick-setting admixture comprising aluminum sulfate, a calcium aluminate, a water-reducing agent and water, to cement concrete containing an inorganic powder (Patent Document 14), a technique of adding a liquid quick-setting admixture to concrete employing cement containing calcium carbonate (Patent Document 15) and a technique of incorporating calcium carbonate to a cement composition and using a liquid quick-setting admixture in combination therewith (Patent Documents 16, 17 and 18) have been published. However, in these techniques due to alkali of the cement component contained in a large amount, calcium carbonate will not be an acidic atmosphere, and the slurry quick-setting admixture tends to form bubbles, and they are neither techniques to prevent solidification nor techniques to obtain a low dusting property by means of a showering tube.

Further, with a mixture having a quick-setting admixture preliminarily incorporated to a cement composition, it is not possible to obtain a fluidity retention of concrete. Accordingly, it was necessary to mix immediately before spraying, an aggregate, a cement composition and a liquid quick-setting admixture, and there was a problem such that a spraying concrete having a uniform composition was hardly obtainable. Further, no mention was made with respect to the effectiveness of an alkali metal sulfate in a quick-setting admixture wherein an acidic substance and a blowing agent are used in combination.

In recent years, it has been desired to develop a quick-setting admixture which is less influential to a human body as compared with a conventional basic quick-setting admixture, which is excellent in providing initial strength and which is scarcely solidified at the portion of the quick-setting admixture-adding tool.

Patent Document 1: JP-B-60-004149
Patent Document 2: JP-A-09-019910
Patent Document 3: JP-A-2001-509124
Patent Document 4: JP-A-10-087358
Patent Document 5: JP-A-2001-130935
Patent Document 6: JP-A-2000-302505
Patent Document 7: JP-A-2000-302506
Patent Document 8: JP-A-2001-302323
Patent Document 9: JP-A-2002-080250
Patent Document 10: JP-A-2002-047048
Patent Document 11: JP-A-2004-035387
Patent Document 12: JP-A-2002-220270
Patent Document 13: WO2005/019131
Patent Document 14: JP-A-2001-270768
Patent Document 15: JP-A-2003-321263
Patent Document 16: JP-A-11-79818
Patent Document 17: JP-A-2001-270768
Patent Document 18: JP-A-2007-119263

DISCLOSURE OF THE INVENTION

Object to be Accomplished by the Invention

Under the above-described circumstances, it is an object of the present invention to provide a quick-setting admixture which is less influential to human body as compared with a conventional basic quick-setting admixture and which is excellent in performance of the initial strength and is scarcely solidified at the portion of a quick-setting admixture-adding tool.

Means to Accomplish the Object

The present invention provides the following:

(1) A slurry quick-setting admixture which comprises water and a powder quick-setting admixture comprising an alkaline earth metal carbonate, a water-soluble acidic substance, calcium aluminate and an alkali metal sulfate.

(2) The slurry quick-setting admixture according to claim 1, which further contains calcium sulfate.

(3) The slurry quick-setting admixture according to the above (1) or (2), which further contains calcium hydroxide and/or aluminum hydroxide.

(4) The slurry quick-setting admixture according to any one of the above (1) to (3), which further contains a retarder.

(5) A quick-setting cement concrete comprising the slurry quick-setting admixture as defined in any one of the above (1) to (4), and cement concrete.

(6) A spraying method which comprises mixing water and a powder quick-setting admixture comprising an alkaline earth metal carbonate, a water-soluble acidic substance, calcium aluminate and an alkali metal sulfate, to form a slurry quick-setting admixture, mixing this slurry quick-setting admixture with cement concrete to form a quick-setting cement concrete, and spraying this quick-setting cement concrete.

(7) A spraying method which comprises joining and mixing, in a slurrying nozzle, water transported in a water supply line and a powder quick-setting admixture transported in a powder quick-setting admixture supply line and comprising an alkaline earth metal carbonate, a water-soluble acidic substance, calcium aluminate and an alkali metal sulfate, to form a slurry quick-setting admixture, introducing this slurry quick-setting admixture via a slurry quick-setting admixture inlet port to a showering tube to mix it with cement concrete via slurry quick-setting admixture-adding holes to form a quick-setting cement concrete, and spraying this quick-setting cement concrete.

(8) The spraying method according to the above (7), wherein the showering tube has a double structure composed of an outer tube and an inner tube, and the inner tube has the slurry quick-setting admixture-adding holes.

(9) The spraying method according to any one of the above (6) to (8), wherein the powder quick-setting admixture contains calcium sulfate.

(10) The spraying method according to any one of the above (6) to (9), wherein the powder quick-setting admixture contains calcium hydroxide and/or aluminum hydroxide.

(11) The spraying method according to any one of the above (6) to (10), wherein the powder quick-setting admixture contains a retarder.

(12) A quick-setting admixture for spraying which comprises a liquid quick-setting admixture, and a powder admixture comprising a blowing agent and calcium aluminate.

(13) The quick-setting admixture for spraying according to the above (12), wherein the blowing agent is an alkaline earth metal carbonate.

(14) The quick-setting admixture for spraying according to the above (12) or (13), wherein the powder admixture further contains calcium sulfate.

(15) The quick-setting admixture for spraying according to any one of the above (12) to (14), wherein the powder admixture further contains an alkali metal sulfate.

(16) The quick-setting admixture for spraying according to any one of the above (12) to (15), wherein the liquid quick-setting admixture further contains an alkali metal element.

(17) The quick-setting admixture for spraying according to any one of the above (12) to (16), wherein the liquid quick-setting admixture contains a compound having a fluorine element.

(18) The quick-setting admixture for spraying according to any one of the above (12) to (17), which comprises, in 100 parts of the powder admixture, from 2 to 30 parts of an alkaline earth metal carbonate, from 30 to 70 parts of calcium aluminate, from 2 to 50 parts of an alkali metal sulfate and from 5 to 40 parts of calcium sulfate.

(19) The quick-setting admixture for spraying according to any one of the above (12) to (18), wherein the ratio of the liquid quick-setting admixture to the powder admixture is from 95:5 to 30:70 by mass ratio.

(20) The quick-setting admixture for spraying according to any one of the above (12) to (19), wherein the liquid quick-setting admixture and the powder admixture are mixed in a slurry form.

(21) The quick-setting admixture for spraying according to any one of the above (12) to (20), which has a pH of from 3 to 9 upon expiration of one minute after mixing the liquid quick-setting admixture and the powder admixture.

(22) A spraying material which comprises cement, an aggregate and the quick-setting admixture for spraying as defined in any one of the above (12) to (21).

(23) The spraying material according to the above (22), wherein the amount of the quick-setting admixture for spraying comprising the liquid quick-setting admixture and the powder admixture, is from 5 to 25 parts, per 100 parts of the cement.

(24) A spraying method which comprises using the spraying material as defined in the above (22) or (23).

Effects of the Invention

By adopting the quick-setting admixture for spraying, the spraying material and the spraying method using it according to the present invention, it is possible to control solidification of the quick-setting admixture in the quick-setting admixture-adding tool, and the effects to impart a highly quick-setting property and durability to cement concrete, can be obtained.

BRIEF DESCRIPTION OF DRAWINGS

FIG. 3 is a cross-sectional view showing an internal structure of the showering tube.

MEANINGS OF SYMBOLS

Figure 1:
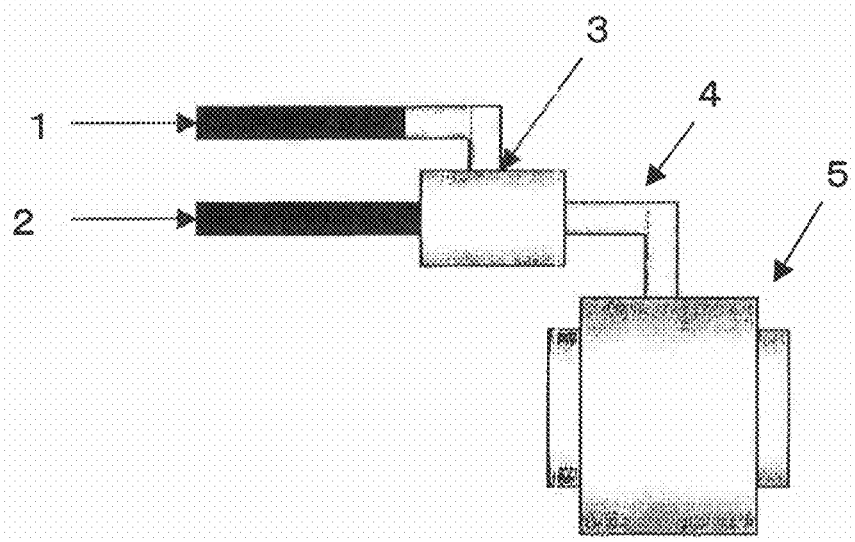
FIG. 1 is an external view of a slurrying nozzle/showering tube.

1: Water or liquid quick-setting admixture supply line
2: Powder quick-setting admixture or powder admixture supply line
3: Slurrying nozzle
4: Slurry quick-setting admixture inlet
5: Showering tube
6: Slurry quick-setting admixture-adding holes

BEST MODE FOR CARRYING OUT THE INVENTION

Now, the present invention will be described in detail. In the following description, percent (%) and parts are based on mass unless otherwise specified.

The term "cement concrete" in the present invention is a generic term for a cement paste, mortar and concrete. Further, "parts" or "%" in the present invention is based on mass unless otherwise specified.

The slurry quick-setting admixture of the present invention comprises water and a powder quick-setting admixture comprising an alkaline earth metal carbonate, a water-soluble acidic substance, calcium aluminate and an alkali metal sulfate. Further, it preferably comprises an alkaline earth metal carbonate, a water-soluble acidic substance, calcium aluminate, an alkali metal sulfate, calcium sulfate, calcium hydroxide and/or aluminum hydroxide, an alkali metal carbonate, an aluminate and a retarder.

Further, the powder admixture of the present invention comprises a blowing agent and calcium aluminate. Further, it preferably comprises an alkaline earth metal carbonate, calcium aluminate, calcium sulfate and an alkali metal sulfate. By using the powder quick-setting admixture in combination with the liquid quick-setting admixture, it is possible to obtain the effect to prevent solidification of the slurry in the quick-setting admixture-adding tool.

The alkaline earth metal carbonate to be used in the present invention, is used for the purpose of solving solidification of the slurry in the quick-setting admixture-adding tool. As such an alkaline earth metal carbonate, calcium carbonate or magnesium carbonate is, for example, preferred. By using the alkaline earth metal carbonate in combination with a water-soluble acidic substance, it is possible to prevent deposition of a solidified product of slurry in the tool, since carbon dioxide gas is generated to cause bubbling in the slurry when a slurry quick-setting admixture is prepared by mixing with water.

The alkaline earth metal carbonate has an effect to readily adjust the slurry to a neutral region and to improve neutralization resistance of the spray cured product. The alkaline earth metal carbonate exhibits such effects when incorporated to the slurry quick-setting admixture, and the effect is different from the same substance preliminarily mixed to cement concrete.

The particle size or the particle size distribution of the alkaline earth metal carbonate is not particularly limited. The Blaine specific surface area value (hereinafter referred to simply as the Blaine value) is preferably from 500 to 10,000 $cm^2/g$, more preferably from 1,000 to 5,000 $cm^2/g$, from the viewpoint of the effect to prevent solidification of the slurry. If the Blaine value is less than 500 $cm^2/g$, it will not be uniformly dispersed in the powder quick-setting admixture, and the prescribed effect may not sometimes be obtainable.

The alkaline earth metal carbonate is preferably from 2 to 30 parts, more preferably from 5 to 20 parts, most preferably from 7 to 15 parts, in 100 parts of the powder quick-setting admixture. If the amount is less than 2 parts, an excellent effect to prevent solidification of the slurry may not sometimes be obtained, and if it exceeds 30 parts, an excellent quick-setting property may not sometimes be obtained.

Further, the alkaline earth metal carbonate is preferably from 2 to 50 parts, more preferably from 5 to 30 parts, most preferably from 8 to 30 parts, in 100 parts of the powder admixture. If the amount is less than 2 parts, an excellent effect to prevent solidification of the slurry may not sometimes be obtained, and if it exceeds 50 parts, an excellent quick-setting property may not sometimes be obtained.

The water-soluble acidic substance to be used in the present invention is a generic term for a substance showing acidity when dissolved in water. Any substance may be used so long as it is a substance which readily dissolves in water to bring the pH of the slurry quick-setting admixture comprising a powder quick-setting admixture and water to an acidic region and to react with an alkaline earth metal carbonate to generate carbon dioxide gas bubbles. After such a slurry quick-setting admixture is mixed with cement concrete, the atmosphere tends to be alkaline, whereby the bubble forming reaction will be terminated, and the cured product will be free from expansion or breakage by bubbled gas. The water-soluble acidic substance may, for example, be a sulfate, alum, a nitrate, a chloride, a phosphate or a hydroxylate. Among them, aluminum sulfate is preferred as the sulfate, and oxalic acid is preferred as the hydroxylate, since they are excellent in providing the initial strength. Among them, aluminum sulfate is most preferred.

The aluminum sulfate may be anhydrous or hydrated. The above water-soluble acidic substances may be used alone or in combination as a mixture of two or more of them.

With respect to the particle size or particle size distribution of the water-soluble acidic substance, the Blaine value is preferably at least 500 $cm^2/g$, more preferably at least 1,000 $cm^2/g$, whereby its solubility is fast when mixed with water, and it quickly reacts with the alkaline earth metal carbonate to form bubbles.

The amount of the water-soluble acidic substance is preferably from 3 to 50 parts, more preferably from 5 to 40 parts, in 100 parts of the powder quick-setting admixture. If the amount is outside this range, an excellent performance to prevent solidification may not sometimes be obtained.

Calcium aluminate to be used in the present invention is a substance which is cured when contacted with water and which is capable of increasing the performance of the initial strength when mixed with cement concrete. It is one obtainable by subjecting a mixture of CaO material, $Al_2O_3$ material, etc., to thermal treatment such as firing in a kiln or melting in an electric furnace, followed by pulverization. When CaO is abbreviated as C, and $Al_2O_3$ is abbreviated as A, the mixture may, for example, be $C_3A$, $C_{12}A_7$, $C_{11}A_7 \cdot CaF_2$, $C_{11}A_7 \cdot CaCl_2$, CA or $CA_2$. They may be used alone or in combination as a mixture of two or more of them. (Here, $CaF_2$ is calcium fluoride, and $CaCl_2$ is calcium chloride.)

Further, calcium aluminosilicate may also be used, wherein alkali metals such as Na, K and Li are solid-solubilized in an amount of from 0.05 to 10% as calculated as $R_2O$ (wherein R is an alkali metal element) (e.g. $8CaO \cdot Na_2O \cdot 3Al_2O_3$), or $SiO_2$ is contained in an amount of less than 30%.

Further, the calcium aluminate to be used in the present invention may further contain one or more of ferrous oxide, ferric oxide, manganese oxide, magnesia, phosphoric acid and an alkali in an amount of less than 30%.

The calcium aluminate may be amorphous or crystalline, or a mixture thereof. However, it preferably contains at least 80%, more preferably at least 90%, of amorphous one, whereby the quick-setting property is excellent.

The molar ratio of $CaO/Al_2O_3$ in the calcium aluminate is not particularly limited, but it is preferably within a range of from 1.5 to 3.0, more preferably from 1.7 to 2.3. Outside this range, an excellent quick-setting property may not sometimes be obtained.

The particle size or particle size distribution of the calcium aluminate is not particularly limited, but the Blaine value is preferably at least 3,000 $cm^2/g$, more preferably at least 5,000 $cm^2/g$, from the viewpoint of the development of the initial strength. If the Blaine value is less than 3,000 $cm^2/g$, an excellent quick-setting property may not sometimes be obtained.

The calcium aluminate is preferably from 20 to 70 parts, more preferably from 35 to 60 parts, in 100 parts of the power quick-setting admixture. Outside this range, an excellent quick-setting property may not sometimes be obtained. Further, the calcium aluminate is preferably from 30 to 70 parts, more preferably from 40 to 60 parts, in 100 parts of the powder admixture. Outside this range, an excellent quick-setting property may not sometimes be obtained.

The alkali metal sulfate to be used in the present invention is used for the purpose of improving the quick-setting property or development of the strength and is a suitable substance to be used in a composition wherein an acidic substance and a blowing agent are used in combination, and it is different in effects from an alkali metal-containing substance which has been used in a conventional quick-setting admixture and which shows alkalinity when dissolved in water. The alkali metal may, for example, be an alkali metal element such as lithium, sodium or potassium.

With respect to the particle size or particle size distribution of the alkali metal sulfate, the Blaine value is preferably at least 500 $cm^2/g$, more preferably at least 1,000 $cm^2/g$, from the viewpoint of development of the initial strength. If the Blaine value is less than 500 $cm^2/g$, an excellent quick-setting property may not sometimes be obtained.

The alkali metal sulfate is preferably within a range of from 2 to 30 parts, more preferably from 5 to 20 parts, in 100 parts of the powder quick-setting admixture. Outside this range, an excellent quick-setting property may not sometimes be obtained. Further, the alkali metal sulfate is preferably within a range of from 2 to 50 parts, more preferably from 5 to 30 parts, in 100 parts of the powder admixture. Outside this range, an excellent quick-setting property may not sometimes be obtained.

As elements to be contained, the liquid quick-setting admixture of the present invention contains in addition to aluminum and sulfur, if necessary, one or more elements such as fluorine and an alkali metal.

A raw material to supply the aluminum element of the present invention is not particularly limited, and may, for example, be a compound such as amorphous or crystalline aluminum hydroxide, an aluminum sulfate, an aluminate, other inorganic aluminum compounds, an organic aluminum compound or an aluminum complex. Among these compounds, one or more may be used. In the present invention, it is preferred to use an aluminum sulfate which will also be a raw material to supply sulfur element.

The raw material to supply the sulfur element of the present invention is not particularly limited. It may, for example, be elemental sulfur such as sulfur or sublimed sulfur, a sulfide, sulfuric acid or a sulfate, sulfurous acid or a sulfite, thiosulfuric acid or a thiosulfate, or an organic sulfur compound. Among them, one or more may be used. Particularly preferred is sulfuric acid or a sulfate, since the solubility in water is high, the production cost is low, and the quick-setting property is excellent. Among sulfates, a compound which is an alum and which contains an aluminum element and an alkali metal element, is more preferred.

The raw material to supply the fluorine element of the present invention is not particularly limited so long as it is soluble or dispersible in a solvent or water. It may, for example, be hydrofluoric acid, an organic fluorinated compound, a fluorinated salt, silicon fluoride or borofluoride. Among them, one or more may be is used. Particularly, hydrofluoric acid, a fluoride, silicon fluoride or borofluoride is, for example, preferred, since it is free from a danger such as toxicity or explosion, the production cost is low, and the quick-setting property is excellent.

The raw material to supply the alkali metal element of the present invention is not particularly limited. It may, for example, be a water-soluble compound containing an alkali metal element such as lithium, sodium, potassium, rubidium or cesium. Among them, one or more may be used. As such a compound, it is possible to use an oxide, a peroxide, a chloride, a hydroxide, a nitrate, a nitrite, a phosphate, a silicate, an aluminate, a sulfate, a thiosulfate, a persulfate, a sulfide, a carbonate, a hydrogencarbonate, an oxalate, a borate, a fluoride, a silicate, silicon fluoride, alum or a metal alkoxide, of an alkali metal element. Among them, one or more may be used.

Further, in order to improve the performance of the liquid quick-setting admixture, it is possible to use an alkanolamine. Further, in order to stabilize the performance of the liquid quick-setting admixture for a long period, it is possible to use an organic acid such as an oxycarboxylic acid.

A method for mixing a raw material to supply an aluminum element, a raw material to supply a sulfur element, a raw material to supply a fluorine element and a raw material to supply an alkali metal element, an alkanolamine raw material and an oxycarboxylic acid raw material, is not particularly limited.

The contents of the aluminum element, the sulfur element, the fluorine element, the alkali metal element, the alkanolamine and the oxycarboxylic acid in the liquid quick-setting admixture are not particularly limited. Per 100 parts of the sulfur element as calculated as $SO_3$, it is preferred to contain from 25 to 110 parts of the aluminum element as calculated as $Al_2O_3$, from 2 to 50 parts of the fluorine element, and from 2 to 50 parts of the alkali metal element as calculated as $R_2O$ (wherein R is an alkali metal element), and it is more preferred to contain from 30 to 70 parts of the aluminum element as calculated as $Al_2O_3$, from 5 to 30 parts of the fluorine element, and from 5 to 30 parts of the alkali metal element as calculated as $R_2O$. The reason for defining the upper limits of the contents is that the viscosity of the liquid tends to be high, or the long term stability tends to be poor.

In a case where a raw material containing an alkali metal element is used for the liquid quick-setting admixture, the content of the alkali metal element in 100 parts of the liquid quick-setting admixture preferably exceeds 1% as calculated as $R_2O$ (wherein R is an alkali metal element), more preferably at least 2%. The upper limit of the content of the alkali metal element is at most 5%.

From such a nature that various types of materials are used in combination, the liquid quick-setting admixture of the present invention may use those other than the elements and components contained in the liquid quick-setting admixture of the present invention, within a range not to substantially deteriorate the effects of the present invention.

Further, it is also possible to use a known water-soluble hydration accelerator in combination with the liquid quick-setting admixture of the present invention.

The concentration of the solid content in the liquid quick-setting admixture is preferably from 20 to 60%, more preferably from 25 to 50%. If it is less than 20%, an excellent quick-setting property may not sometimes be obtained, and if it exceeds 60%, the viscosity of the liquid tends to be high, and the pneumatic transportation by a pump may sometimes tend to be poor.

The liquid quick-setting admixture of the present invention is preferably acidic, and its pH is preferably from 1 to 5, more preferably from 2 to 4.

The form of the liquid quick-setting admixture of the present invention is liquid and includes one in the form of a suspension. The size of the suspended particles in the suspension is not particularly limited, but it is preferably at most 5 μm, more preferably at most 3 μm, from the dispersibility of the suspended particles.

For the powder quick-setting admixture or powder admixture, it is possible to use, in addition to the materials used for the above-mentioned liquid quick-setting admixture, calcium sulfate, calcium hydroxide and/or aluminum hydroxide, an alkali metal carbonate, an aluminate, a retarder, etc.

The calcium sulfate to be used in the present invention, is used for the purpose of improving development of the strength of the cured product. The calcium sulfate may, for example, be anhydrite, gypsum hemihydrate or gypsum dihydrate. Among them, one or more may be used.

The form of crystal of the calcium sulfate is not particularly limited, and an α-type gypsum hemihydrate, a β-type gypsum hemihydrate, a I-type anhydrite, a II-type anhydrite or a III-type anhydrite may, for example, be used.

Further, the above calcium sulfate includes naturally produced one, or stack gas desulfurization gypsum or fluorogypsum obtained as an industrial byproduct. The particle size of the calcium sulfate is preferably at least 2,000 cm²/g, more preferably at least 3,000 cm²/g, by Blaine value, from the viewpoint of development of the strength. The calcium sulfate is preferably from 4 to 50 parts, more preferably from 8 to 30 parts, in 100 parts of the powder quick-setting admixture. Outside this range, an excellent quick-setting property may not sometimes be obtained. Further, the calcium sulfate is preferably from 5 to 40 parts, more preferably from 10 to 30 parts, in 100 parts of the powder admixture. Outside this range, an excellent quick-setting property may not sometimes be obtained.

In order to improve the quick-setting property or the adhesion to the ground at the time of spraying, calcium hydroxide and/or aluminum hydroxide may be incorporated.

The calcium hydroxide includes quicklime or slaked lime to be formed when carbide is hydrated. The reason is such that water is used for cement concrete, and therefore, it is possible to use quicklime or the like which forms calcium hydroxide in a large amount by a reaction with water, or to use it in combination with calcium hydroxide.

The form of crystal of calcium hydroxide is not particularly limited.

Aluminum hydroxide is a substance represented by a chemical formula of e.g. $Al(OH)_3$ or $AlO(OH).nH_2O$. The aluminum hydroxide includes crystalline or amorphous one, and either one may be used. However, it is preferred to use amorphous aluminum hydroxide.

The powder of calcium hydroxide or aluminum hydroxide is not particularly limited, but the Blaine value is preferably at least 4,000 cm²/g, more preferably at least 8,000 cm²/g. If the Blaine value is less than 4,000 cm²/g, an excellent adhesion to the ground at the time of spraying may not sometimes be obtained.

The calcium hydroxide and/or aluminum hydroxide is preferably from 2 to 30 parts, more preferably from 3 to 20 parts, in 100 parts of the powder quick-setting admixture. If the amount is less than 2 parts, no adequate adhesion to the ground at the time of spraying may be obtained, and if it exceeds 30 parts, the quick-setting property or development of a long term strength tends to be impaired. Further, the calcium hydroxide and/or aluminum hydroxide is preferably from 2 to 30 parts, more preferably from 3 to 20 parts, in 100 parts of the powder admixture. If the amount is less than 2 parts, an excellent adhesion to the ground at the time of spraying may not sometimes be obtained, and if it exceeds 30 parts, development of a long term strength may sometimes be impaired.

In the present invention, in the powder quick-setting admixture or the powder admixture, an alkali substance such as an alkali metal carbonate or an aluminate may be contained.

The retarder may, for example, be an oxycarboxylic acid such as citric acid, tartaric acid, malic acid or gluconic acid, or an alkali metal salt such as a sodium or potassium salt of such an oxycarboxylic acid. They may be used alone or in combination as a mixture of two or more of them. Among them, from the viewpoint of development of the strength, an oxycarboxylic acid and/or an alkali metal salt of an oxycarboxylic acid is preferred, and citric acid and/or an alkali metal salt of citric acid is more preferred.

The amount of the retarder is preferably from 0.05 to 5 parts, more preferably from 0.1 to 2 parts, per 100 parts of the powder quick-setting admixture or the powder admixture. Outside this range, the quick-setting property or the adhesion to the ground at the time of spraying may not sometimes be obtained.

Now, a method for using the slurry quick-setting admixture of the present invention will be described.

It is preferred to mix water and the powder quick-setting admixture to obtain a slurry quick-setting admixture immediately before addition of cement concrete, with a view to improvement of the mixing property with the cement concrete.

In the present invention, in order to adjust the setting time, a retarder may be incorporated. In a case where the amount of slurrying water to be mixed for the slurry quick-setting admixture is small, for example, in a case where the proportions of the slurrying water and the powder quick-setting admixture are such that the mass ratio of water and the powder quick-setting admixture is from 30:70 to 40:60, if a retarder is incorporated, the quick-setting property will be improved. The proportions of water and the powder quick-setting admixture are preferably from 40:60 to 60:40, more preferably from 45:55 to 55:45, by mass ratio. Outside this range, an excellent quick-setting property or development of the strength may not sometimes be obtained.

The amount of the slurry quick-setting admixture comprising water and the powder quick-setting admixture is preferably from 4 to 20 parts, more preferably from 6 to 12 parts, as calculated as the solid content, per 100 parts of cement concrete. If the amount is less than 4 parts, an excellent quick-setting property may not sometimes be obtained, and if it exceeds 20 parts, no further improvement in the quick-setting property will be obtained, and the amount of use becomes large, such being economically undesirable.

Now, a method for using a quick-setting admixture for spraying of the present invention will be described.

The quick-setting admixture for spraying of the present invention is one obtained by mixing the liquid quick-setting admixture and a powder admixture comprising a blowing agent and calcium aluminate.

The proportions of the liquid quick-setting admixture and the powder admixture of the present invention are not particularly limited, but they are preferably from 95:5 to 30:70, more preferably from 90:10 to 50:50, by mass ratio. Outside this range, an excellent quick-setting property or development of strength may not sometimes be obtained. In the present invention, the amount of the liquid quick-setting admixture means the amount as the liquid.

In the present invention, it is preferred to mix the liquid quick-setting admixture and the powder admixture to obtain a slurry immediately before addition to cement concrete, with a view to improvement of the mixing property with the cement concrete.

For example, in a case where the liquid quick-setting admixture is added alone to cement concrete, the neutralization resistance of the cured product may sometimes be deteriorated. With a spray cured product obtained by using a quick-setting admixture for spraying slurried by mixing the liquid quick-setting admixture and the powder admixture as in the present invention, the resistance against neutralization will be improved over the neutralization resistance in a case where only the liquid quick-setting admixture is used.

This is considered to be attributable to the fact that the pH of slurry is readily adjusted to a neutral region by the blowing agent such as a carbonate contained in the powder admixture. With a view to improvement of the resistance against neutralization, it is preferred to mix the liquid quick-setting admixture and the powder admixture to bring the pH upon expiration of one minute from the mixing to a level of from 3 to 9, more preferably from 4 to 6.

Accordingly, use of the powder admixture containing a blowing agent, and the liquid quick-setting admixture in combination, is not only effective for preventing solidification of the slurry in the quick-setting admixture-adding tool, but also effective for improvement in the spray cured product.

The amount of the quick-setting admixture for spraying comprising the liquid quick-setting admixture and the powder admixture of the present invention is not particularly limited, but it is preferably from 5 to 25 parts, more preferably from 8 to 15 parts, per 100 parts of cement. If the amount is less than 5 parts, the quick-setting property may not sometimes be obtained, and if it exceeds 25 parts, no further improvement in the quick-setting property will be obtained, and the amount tends to be large, such being economically undesirable.

As the tool for adding the quick-setting admixture for spraying, any tool may be used so long as the spraying performance will not substantially be deteriorated in a case where the quick-setting admixture is added to cement concrete. For example, Y-tube or an inlet piece (hereinafter referred to also as a showering tube) may, for example, be used. However, it is preferred to use a showering tube, since the mixing property with cement concrete will thereby be excellent, and spraying will be possible with small compression air amount. It is particularly preferred to use a tool (a slurrying nozzle) to mix water or a liquid quick-setting admixture with a powder quick-setting admixture or a powder admixture to form a slurry prior to introduction to the showering tube.

Figure 2:
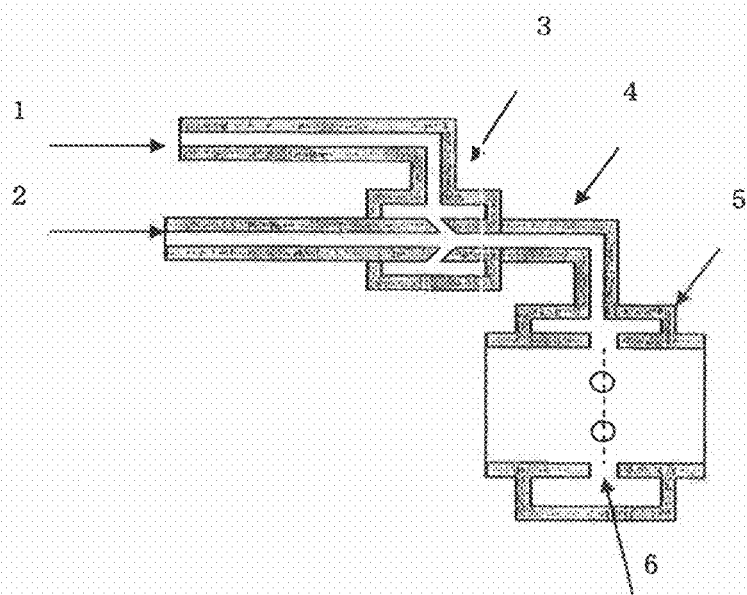
FIG. 2 is a cross-sectional view showing an internal structure of the slurrying nozzle/showering tube.

As the slurrying nozzle/showering tube to be used in the present invention, one shown in FIGS. 1 to 3 may, for example, be used. A water or liquid quick-setting admixture supply line 1 and a powder quick-setting admixture or powder admixture supply line 2 are joined at a slurrying nozzle 3, where the supplied raw materials are mixed and slurried. Further, the slurried quick-setting admixture is introduced into a showering tube 5 by a slurry quick-setting admixture inlet 4 and added to cement concrete via a slurry quick-setting admixture-adding holes 6.

Compressed air to be use for spraying will be supplied from the water or liquid quick-setting admixture-supply line 1 or from the powder quick-setting admixture or powder admixture supply line 2. The amount of the compressed air to be used for spraying is preferably from 2 m$^3$/min to 10 m$^3$/min, more preferably from 3 m$^3$/min to 7 m$^3$/min.

The showering tube 5 to be used in the present invention may, for example, have a double structure comprising an outer tube and an inner tube. The diameter of the inner tube in which cement concrete is pneumatically transported, is usually from about 1.0 to 3.5 inches, preferably from 2.5 to 3.2 inches, and the inner tube has at least two slurry quick-setting admixture-adding holes 6.

The number of slurry quick-setting admixture-adding holes 6 of the inner tube is preferably from 2 to 15, more preferably from 4 to 10. If the slurry quick-setting admixture-adding hole 6 is only one, uniform mixing of cement concrete with the slurry quick-setting admixture may not be obtained, and an excellent adhesion or dust-reducing property may not sometimes be obtained. If the number of such holes is 16 or more, the slurry quick-setting admixture-adding holes 6 may sometimes be clogged.

Further, the length of the showering tube 5 is not particularly limited, but it is usually from about 5 to 50 cm, preferably from 20 to 40 m. Other dimensions, etc. are not particularly limited.

The material of the showering tube 5 is not particularly limited, but one made of metal, resin or plastic may be used, or a combination of these materials may also be used.

The shape of the slurry quick-setting admixture-adding holes 6 to be used in the present invention is not particularly limited. Further, it is also preferred to provide them to be perpendicular to the flow of cement concrete or to have an angle towards the outlet of the cement concrete.

The total area of the slurry quick-setting admixture-adding holes 6 is not particularly limited, but it is preferably from 2 to 30 cm$^2$, more preferably from 4 to 20 cm$^2$. If it is less than 2 cm$^2$, the slurry quick-setting admixture-adding holes 6 may sometimes be clogged, and if it exceeds 30 cm$^2$, uniform mixing of cement concrete with the slurry quick-setting admixture tends to be difficult, and an excellent adhesion or dust-reducing performance may not sometimes be obtained.

The water or liquid quick-setting admixture for slurrying of the present invention is heated within a range of from 20° C. to 90° C., preferably from 10° C. to 50° C., more preferably from 15° C. to 45° C. and then mixed with a powder quick-setting admixture or powder admixture, whereby the quick-setting property can be improved.

In a case where the slurry quick-setting admixture of the present invention is to be mixed with cement concrete, it is preferred to carry out the mixing immediately before spraying the slurry quick-setting admixture. Specifically, the slurry quick-setting admixture is added to pneumatically transported cement concrete to obtain a quick-setting cement concrete. The time until the quick-setting cement concrete is discharged, is adjusted to be preferably within 5 seconds, more preferably within 2 seconds.

The cement to be used in the present invention is not particularly limited. For example, any one of various types of portland cements such as early-strength, ultrahigh-early-strength, moderate-heat and low-heat cement, and various mixed cements having blast-furnace slag, fly ash or limestone powder mixed to such portland cements, may be used. In the mixed cements, the proportions of such an additive and cement are not particularly limited. Even one having an additive mixed beyond the value stipulated in JIS may be used.

The amount of cement is not particularly limited, but it is preferably at least 350 kg/m$^3$, more preferably at least 400 kg/m$^3$, whereby development of the strength will be excellent.

The percentage of W/C (water/cement ratio) of cement concrete is preferably from 40 to 70%, more preferably from 45 to 60%.

In the present invention, in addition to the above-mentioned various materials and an aggregate such as sand or gravel, a water-reducing agent, fiber, etc. may be used in combination.

The water-reducing agent may be any known water-reducing agent of ligninsulfonic acid type, naphthalenesulfonic acid type or polycarboxylic acid type. The amount of the water-reducing agent is preferably from 0.2 to 2.0%, more preferably from 0.5 to 1.5%, based on the amount of cement.

The spraying method to a slope or tunnel according to the present invention may be any spraying method of dry or wet system, which is commonly employed. It is particularly preferred to employ a wet spraying method, whereby the amount of dust to be formed is little.

EXAMPLES

Now, the present invention will be described in further detail with reference to Examples, but it should be understood that the present invention is by no means restricted thereto.

Further, Examples were all carried out at room temperature (20° C.) unless otherwise specified.

Example 1

Water for slurrying and a powder quick-setting admixture comprising an alkaline earth metal carbonate, a water-soluble acidic substance, calcium aluminate, calcium sulfate, an alkali metal sulfate and calcium hydroxide in the amounts as shown in Table 1, were joined and mixed in a mass ratio of 50:50. The powder quick-setting admixture was transported in a pneumatic transportation amount of 5 kg/min together with air in an amount of 4 m$^3$/min by means of a pneumatic transportation hose of 1 inch (2.54 cm). On the other hand, the water for slurrying was pumped at a rate of 5 kg/min. The two were joined and mixed at the slurrying nozzle (the one shown in FIGS. 1 and 2) and introduced in the form of a slurry to the showering tube (the one shown in FIGS. 1 to 3, hole size: diameter of 8 mm×6 holes, inner diameter of 3 inch (7.62 cm)× length of 30 cm, material: steel). This state was maintained for a predetermined time, and the showering tube was disassembled, and the internal situation was confirmed. Further, for the purpose of comparison, a case wherein no alkaline earth metal carbonate was used, was tested as a Comparative Example. The results are shown in Table 1.

Physical Properties of Materials Used

Alkaline earth metal carbonate: Calcium carbonate, pulverized product of natural ore, Blaine value: 3,000 cm$^2$/g Water-soluble acidic substance (A): Aluminum sulfate octahydrate, Blaine value: 1,000 cm$^2$/g, commercial product Water-soluble acidic substance (B): Oxalic acid dihydrate, Blaine value: 500 cm$^2$/g, commercial product Calcium aluminate: Amorphous, CaO 50%-Al$_2$O$_3$ 45%-SiO$_2$ 5%, CaO/Al$_2$O$_3$ molar ratio: 2.0, vitrification ratio: 98%, Blaine value: 6,000 cm$^2$/g Calcium sulfate: Natural anhydrite, Blaine value: 4,000 cm$^2$/g, commercial product Alkali metal sulfate: Sodium sulfate, Blaine value: 2,000 cm$^2$/g, commercial product Calcium hydroxide: Blaine value: 12,000 cm$^2$/g, commercial product Water: Tap water Measuring Methods Blaine value: Measured in accordance with JIS R5201

Vitrification ratio: Measured by XRD (X-ray diffraction)

Method for Evaluation of Slurried Conditions

After the predetermined time shown in Table 1, the showering tube was disassembled, and the slurried condition was evaluated by the internal inspection. The evaluation was carried out under the following standards.

⊚: No deposition of a solidified substance is observed.

○: Deposition is partially observed, but all of six slurry quick-setting admixture-adding holes are penetrating, and no clogging is observed.

Δ: Among six holes, at most two are clogged.

X: Among six holes, three or more are clogged.

TABLE 1

| Test No. | Ratios of raw materials constituting powder quick-setting admixture | | | | | | Total time for introducing slurry into showering tube | | | | | Notes |
|---|---|---|---|---|---|---|---|---|---|---|---|---|
| | Alkaline earth metal carbonate | Water-soluble acidic substance | Calcium aluminate | Calcium sulfate | Alkali metal sulfate | Calcium hydroxide | 5 min | 15 min | 30 min | 45 min | 60 min | |
| 1-1 | — | (A) 33.3 | 44.5 | 11.1 | 11.1 | — | ◉ | ○ | ○ | ○ | Δ | Comp. Ex. |
| 1-2 | — | (A) 30.0 | 40.0 | 10.0 | 10.0 | 10.0 | ○ | ○ | ○ | Δ | X | Comp. Ex. |
| 1-3 | 10.0 | (A) 30.0 | 40.0 | 10.0 | 10.0 | — | ◉ | ◉ | ◉ | ◉ | ◉ | Ex. |
| 1-4 | 10.0 | (B) 30.0 | 40.0 | 10.0 | 10.0 | — | ◉ | ◉ | ◉ | ◉ | ◉ | Ex. |
| 1-5 | 11.1 | (A) 33.3 | 44.5 | — | 11.1 | — | ◉ | ◉ | ◉ | ◉ | ◉ | Ex. |
| 1-6 | 10.0 | (A) 25.0 | 40.0 | 10.0 | 10.0 | 5.0 | ◉ | ◉ | ◉ | ◉ | ◉ | Ex. |
| 1-7 | 1.0 | (A) 33.0 | 44.0 | 11.0 | 11.0 | — | ◉ | ◉ | ○ | ○ | Δ | Ex. |
| 1-8 | 2.0 | (A) 32.7 | 43.5 | 10.9 | 10.9 | — | ◉ | ◉ | ○ | ○ | ○ | Ex. |
| 1-9 | 5.0 | (A) 31.7 | 42.1 | 10.6 | 10.6 | — | ◉ | ◉ | ◉ | ○ | ○ | Ex. |
| 1-10 | 7.0 | (A) 31.0 | 41.4 | 10.3 | 10.3 | — | ◉ | ◉ | ◉ | ◉ | ◉ | Ex. |
| 1-11 | 15.0 | (A) 28.3 | 37.7 | 9.5 | 9.5 | — | ◉ | ◉ | ◉ | ◉ | ◉ | Ex. |
| 1-12 | 20.0 | (A) 26.6 | 35.6 | 8.9 | 8.9 | — | ◉ | ◉ | ◉ | ◉ | ◉ | Ex. |
| 1-13 | 30.0 | (A) 23.3 | 31.1 | 7.8 | 7.8 | — | ◉ | ◉ | ◉ | ◉ | ◉ | Ex. |
| 1-14 | 40.0 | (A) 20 | 26.6 | 6.7 | 6.7 | — | ◉ | ◉ | ◉ | ◉ | ◉ | Ex. |

(Ratios of raw materials constituting power quick-setting admixture represent parts in 100 parts of the powder quick-setting admixture.)
Comp. Ex.: Comparative Example,
Ex.: Examples of the present invention From Table 1, it is evident that when a blowing agent was used, it was possible to obtain the effect for preventing solidification of the slurry.

Example 2

A mortar was prepared by using cement having a blend ratio of cement/sand of 1/3 and W/C (water/cement ratio) of 50%, and a water-reducing agent in an amount of C (amount of cement)×1.0%. Relative to 100 parts of the cement in this mortar, 10 parts, as calculated as a solid content, of a slurry quick-setting admixture (one having the powder quick-setting admixture shown in Table 2 and the slurrying water mixed in a mass ratio of 50:50) was mixed, and the mixture was packed into a framework. The protector penetration resistance value was measured at a test ambient temperature of 20° C. Further, for the purpose of comparison, using 10 parts, as calculated as a solid content, of a commercially available liquid quick-setting admixture, the test was carried out in the same manner (Test No. 2-1). The results are shown in Table 2.

Materials Used
Cement: Ordinary portland cement, commercial product, specific gravity: 3.16
Sand: River sand produced in Himekawa, Niigata prefecture, specific gravity: 2.62
Water-reducing agent: Polycarboxylic acid type high performance water-reducing agent, commercial product
Liquid quick-setting admixture: Water-soluble aluminum salt, pH 2.6, commercial product
Water: Tap water Measuring Method
Protector penetration resistance value: Measured in accordance with JSCE D-102-1999 (measured at material ages of 5 minutes and 15 minutes).

TABLE 2

| Test No. | Ratios of raw materials constituting powder quick-setting admixture | | | | | | Protector penetration resistance value (N/mm$^2$) | | Notes |
|---|---|---|---|---|---|---|---|---|---|
| | Alkaline earth metal carbonate | Water-soluble acidic substance (A) | Calcium aluminate | Calcium sulfate | Alkali metal sulfate | Calcium hydroxide | 5 min | 15 min | |
| 2-1 | — | — | — | — | — | — | 2.3 | 5.1 | Comp. Ex. |
| 2-2 | 10.0 | 38.6 | 51.4 | — | — | — | 12.5 | 20.5 | Comp. Ex. |
| 2-3 | 2.0 | 32.7 | 43.5 | 10.9 | 10.9 | — | 18.6 | 32.3 | Ex. |
| 2-4 | 5.0 | 31.7 | 42.1 | 10.6 | 10.6 | — | 17.6 | 30.4 | Ex. |
| 2-5 | 7.0 | 31.0 | 41.4 | 10.3 | 10.3 | — | 17.1 | 29.2 | Ex. |
| 2-6 | 10.0 | 30.0 | 40.0 | 10.0 | 10.0 | — | 16.2 | 28.6 | Ex. |
| 2-7 | 15.0 | 28.3 | 37.7 | 9.5 | 9.5 | — | 14.6 | 27.7 | Ex. |
| 2-8 | 20.0 | 26.6 | 35.6 | 8.9 | 8.9 | — | 13.1 | 25.4 | Ex. |
| 2-9 | 30.0 | 23.3 | 31.1 | 7.8 | 7.8 | — | 9.6 | 14.1 | Ex. |
| 2-10 | 10.0 | 3.0 | 58.0 | 14.5 | 14.5 | — | 10.8 | 15.4 | Ex. |
| 2-11 | 10.0 | 5.0 | 56.6 | 14.2 | 14.2 | — | 14.2 | 25.2 | Ex. |
| 2-12 | 10.0 | 40.0 | 33.4 | 8.3 | 8.3 | — | 16.2 | 28.6 | Ex. |
| 2-13 | 10.0 | 50.0 | 26.6 | 6.7 | 6.7 | — | 18.4 | 24.5 | Ex. |

TABLE 2-continued

| | Ratios of raw materials constituting powder quick-setting admixture | | | | | | Protector penetration resistance value (N/mm$^2$) | | |
|---|---|---|---|---|---|---|---|---|---|
| Test No. | Alkaline earth metal carbonate | Water-soluble acidic substance (A) | Calcium aluminate | Calcium sulfate | Alkali metal sulfate | Calcium hydroxide | 5 min | 15 min | Notes |
| 2-14 | 10.0 | 42.0 | 20.0 | 14.0 | 14.0 | — | 12.2 | 13.9 | Ex. |
| 2-15 | 10.0 | 33.0 | 35.0 | 11.0 | 11.0 | — | 14.2 | 26.4 | Ex. |
| 2-16 | 10.0 | 18.0 | 60.0 | 6.0 | 6.0 | — | 15.8 | 27.1 | Ex. |
| 2-17 | 10.0 | 12.0 | 70.0 | 4.0 | 4.0 | — | 12.2 | 23.6 | Ex. |
| 2-18 | 10.0 | 32.2 | 43.0 | 4.0 | 10.8 | — | 17.1 | 24.2 | Ex. |
| 2-19 | 10.0 | 30.7 | 41.0 | 8.0 | 10.3 | — | 16.8 | 27.1 | Ex. |
| 2-20 | 10.0 | 22.5 | 30.0 | 30.0 | 7.5 | — | 12.2 | 25.4 | Ex. |
| 2-21 | 10.0 | 15.0 | 20.0 | 50.0 | 5.0 | — | 6.3 | 9.7 | Ex. |
| 2-22 | 10.0 | 33.0 | 44.0 | 11.0 | 2.0 | — | 13.5 | 24.1 | Ex. |
| 2-23 | 10.0 | 31.9 | 42.5 | 10.6 | 5.0 | — | 16.8 | 28.1 | Ex. |
| 2-24 | 10.0 | 26.2 | 35.0 | 8.8 | 20.0 | — | 14.2 | 25.1 | Ex. |
| 2-25 | 10.0 | 22.5 | 30.0 | 7.5 | 30.0 | — | 11.4 | 18.5 | Ex. |
| 2-26 | 10.0 | 25.8 | 41.4 | 10.4 | 10.4 | 2.0 | 14.3 | 24.1 | Ex. |
| 2-27 | 10.0 | 25.6 | 41.0 | 10.2 | 10.2 | 3.0 | 17.3 | 30.4 | Ex. |
| 2-28 | 10.0 | 25.0 | 40.0 | 10.0 | 10.0 | 5.0 | 18.2 | 31.3 | Ex. |
| 2-29 | 10.0 | 23.6 | 37.6 | 9.4 | 9.4 | 10.0 | 18.6 | 32.4 | Ex. |
| 2-30 | 10.0 | 20.6 | 33.0 | 8.2 | 8.2 | 20.0 | 17.9 | 25.5 | Ex. |
| 2-31 | 10.0 | 17.6 | 28.2 | 7.1 | 7.1 | 30.0 | 12.5 | 18.4 | Ex. |

(Ratios of raw materials constituting power quick-setting admixture represent parts in 100 parts of the powder quick-setting admixture. In Test No. 2-1, a liquid quick-setting admixture was used.)

From Table 2, it is evident that excellent quick-setting properties were obtained by using proper amounts of an alkaline earth metal carbonate, a water-soluble acidic substance, calcium aluminate, calcium sulfate, an alkali metal sulfate and calcium hydroxide, etc. in the powder quick-setting admixture.

Example 3

A test was carried out in the same manner as in Example 2 except that the mixing ratio of slurrying water and the powder quick-setting admixture of Test No. 2-6 in Example 2 was changed as shown in Table 3 to obtain a slurry, and the slurry quick-setting admixture was added in an amount of 10 parts as calculated as a solid content per 100 parts of the cement. In Test No. 3-2, the mass ratio of slurry water/powder quick-setting admixture was the same as in Test No. 3-1, but a retarder was further used in an amount of 0.6 part per 100 parts of the powder quick-setting admixture. The results are shown in Table 3.

Material Used

Retarder: Sodium citrate, commercial product

TABLE 3

| | Mixing ratio | | Protector penetration resistance value (N/mm$^2$) | |
|---|---|---|---|---|
| Test No. | Slurrying water | Powder quick-setting admixture | 5 min | 15 min |
| 3-1 | 35 | 65 | 9.7 | 14.3 |
| 3-2 | 35 | 65 | 17.3 | 27.3 |
| 3-3 | 40 | 60 | 13.4 | 24.4 |
| 3-4 | 45 | 55 | 18.2 | 30.3 |
| 2-6 | 50 | 50 | 16.2 | 28.6 |
| 3-5 | 55 | 45 | 15.0 | 25.3 |
| 3-6 | 60 | 40 | 12.6 | 22.1 |
| 3-7 | 65 | 35 | 9.7 | 18.7 |

(In Test No. 3-2, 0.6 part of the retarder was further used per 100 parts of the powder quick-setting admixture.)
(The mixing ratio represents a mass ratio.)

From Table 3, it is evident that excellent quick-setting properties can be obtained by adjusting the ratio of slurrying water and the powder quick-setting admixture to be proper by mass ratio. In Test No. 3-1, the amount of slurry water mixed was small, whereby slurrying was not adequate, and the quick-setting property was low, but it is evident that the quick-setting property was improved in Test No. 3-2 wherein the retarder was used in combination.

Example 4

A test was carried out in the same manner as in Example 2 except that evaluation was carried out by mixing slurrying water and the powder quick-setting admixture of Test No. 2-6 in Example 2 in a mass ratio of 50:50, and the slurry quick-setting admixture was used in an amount shown in Table 4 as calculated as a solid content per 100 parts of the cement. In Test No. 4-2, the mass ratio of the slurrying water/powder quick-setting admixture was the same as in Test No. 4-1, but 0.6 part of the retarder was further used per 100 parts of the powder quick-setting admixture. The results are shown in Table 4.

Measuring Method

Compression strength: Strength after 1 hour was measured in accordance with JIS R5201-2002. Further, the strength after 28 days was measured in accordance with JIS R5201-2002 by aging in water at 20° C.

TABLE 4

| Test No. | Amount used | Protector penetration resistance value (N/mm²) 5 min | Protector penetration resistance value (N/mm²) 15 min | Compression strength (N/mm²) 1 hr | Compression strength (N/mm²) 28 days |
|---|---|---|---|---|---|
| 4-1 | 4 | 10.9 | 14.2 | 0.3 | 43.5 |
| 4-2 | 6 | 14.4 | 25.1 | 0.7 | 42.4 |
| 2-6 | 10 | 16.2 | 28.6 | 1.2 | 40.5 |
| 4-3 | 12 | 23.5 | 38.5 | 1.5 | 38.3 |
| 4-4 | 20 | 33.1 | 45.6 | 2.1 | 36.2 |
| 3-1 | 10 | 9.7 | 14.3 | 0.5 | 35.0 |
| 3-2 | 10 | 17.3 | 27.3 | 0.3 | 40.5 |

(The amount used is the amount of the slurry quick-setting admixture used and represents parts (calculated as a solid content) per 100 parts of the cement. In Test No. 4-2, 0.6 part of the retarder was further used per 100 parts of the powder quick-setting admixture.)

From Table 4, it is evident that excellent quick-setting properties were obtained by adding the quick-setting admixture. In Test No. 3-1, the amount of slurrying water mixed was small, whereby slurrying was inadequate, and the quick-setting property or development of the long term strength was low, but it is evident that the quick-setting property and the development of the long term strength were improved in Test No. 3-2 wherein the retarder was used in combination.

From the foregoing Examples, the following was found. By using the powder quick-setting admixture comprising an alkaline earth metal carbonate, a water-soluble acidic substance, calcium aluminate and an alkali substance, which forms bubbles in the acidic atmosphere of the present invention, it was possible to prevent solidification in a showering tube and to obtain a quick-setting property higher than the conventional quick-setting admixture.

Example 5

A powder admixture comprising 50 parts of calcium aluminate, 20 parts of an alkali metal sulfate, 20 parts of calcium sulfate and 10 parts of an alkaline earth metal carbonate, and the liquid quick-setting admixture shown in Table 1, were joined and mixed in a mass ratio of 2:1. The powder admixture was transported at a rate of 3 kg/min together with air in a pneumatic transportation amount of 4 m³/min by means of a pneumatic transportation hose of 1 inch, while the liquid quick-setting admixture was pumped at a rate of 6 kg/min. The two were joined and mixed at a slurrying nozzle (one shown in FIGS. 1 and 2). Then, the mixture was, in the slurry form, introduced to the showering tube (the one shown in FIGS. 1 to 3, hole size: 8 mm in diameter×6 holes, inner diameter of 3 inch× length of 30 cm, material: steel). For a predetermined time, this state was maintained, and then the showering tube was disassembled, and the internal situation was confirmed. Further, for the purpose of comparison, a case wherein no alkaline earth metal carbonate was used, and a case wherein calcium hydroxide was used, were tested as Comparative Examples. The results are shown in Table 5.

Materials Used

Calcium aluminate: Amorphous composition of 12CaO.7Al$_2$O$_3$, Blaine value: 6,000 cm²/g.

Alkali metal sulfate: Sodium sulfate, Blaine value: at least 1,000 cm²/g, commercial product Calcium sulfate: Natural anhydrite, Blaine value: 4,000 cm²/g, commercial product Alkaline earth metal carbonate: Calcium carbonate, Blaine value: 3,000 cm²/g, commercial product Calcium hydroxide: Blaine value: 12,000 cm²/g, commercial product Liquid quick-setting admixture (E1): Al$_2$O$_3$: 8.0%, SO$_3$: 18.8%, Na$_2$O: 0%, pH 2.3, aluminum sulfate solution, solid content concentration: 26.8%, commercial product. Aluminum is contained in an amount of 42.6 parts as calculated as Al$_2$O$_3$ per 100 parts of sulfur as calculated as SO$_3$.

Liquid quick-setting admixture (E2): Al$_2$O$_3$: 8.0%, SO$_3$: 18.8%, Na$_2$O: 3.0%, pH 2.9, an aluminum sulfate solution, wherein powder aluminum sulfate and sodium carbonate were mixed in predetermined amounts and dissolved at 80° C. Solid content concentration: 26.8%, the aluminum element is contained in an amount of 42.6 parts as calculated as Al$_2$O$_3$ per 100 parts of the sulfur element as calculated as SO$_3$, and the alkali metal element is contained in an amount of 16 parts as calculated as R$_2$O (wherein R is an alkali metal element).

Liquid quick-setting admixture (E3): Al$_2$O$_3$: 8.0%, SO$_3$: 18.8%, Na$_2$O: 3.0%, F: 3.0%, pH 2.7, an aluminum sulfate solution wherein powder aluminum sulfate, sodium carbonate and hydrofluoric acid were mixed in predetermined amounts and dissolved at 80° C. Solid content concentration: 26.8%, comprising 42.6 parts as calculated as Al$_2$O$_3$ of the aluminum element, 16 parts of fluorine, and 16 parts as calculated as R$_2$O (wherein R is an alkali metal element) of the alkali metal element, per 100 parts of the sulfur element as calculated as SO$_3$.

Measuring Methods pH: Measured by using a pH meter (manufactured by HORIBA, Ltd.)

Blaine value: Measured in accordance with JIS R5201

Method for Evaluation of Slurried Conditions

After the predetermine time shown in Table 1, the showering tube was disassembled, and the slurried condition was inspected by the internal observation. The evaluation was carried out under the following standards.

◎: No deposition of a solidified substance is observed.

○: Deposition is partially observed, but all of six slurry quick-setting admixture-adding holes are penetrating, and no clogging is observed.

Δ: Among six holes, at most two are clogged.

X: Among six holes, three or more are clogged.

TABLE 5

| Test No. | Liquid quick-setting admixture | Alkaline earth metal carbonate | Calcium aluminate | Alkali metal sulfate | Calcium sulfate | Calcium hydroxide | 5 min | 15 min | 30 min | 45 min | 60 min | Notes |
|---|---|---|---|---|---|---|---|---|---|---|---|---|
| 5-1 | (E3) | — | 55.6 | 22.2 | 22.2 | — | ◎ | ○ | ○ | ○ | Δ | Comp. Ex. |
| 5-2 | (E3) | — | 50 | 20 | 20 | 10 | ○ | ○ | ○ | Δ | X | Comp. Ex. |
| 5-3 | (E3) | 10 | 50 | 20 | 20 | — | ◎ | ◎ | ◎ | ◎ | ◎ | Ex. |
| 5-4 | (E3) | 10 | 90 | — | — | — | ◎ | ◎ | ◎ | ◎ | ◎ | Ex. |

TABLE 5-continued

| | | Ratios of raw materials constituting powder quick-setting admixture | | | | | Total time for introducing slurry into showering tube | | | | | |
|---|---|---|---|---|---|---|---|---|---|---|---|---|
| Test No. | Liquid quick-setting admixture | Alkaline earth metal carbonate | Calcium aluminate | Alkali metal sulfate | Calcium sulfate | Calcium hydroxide | 5 min | 15 min | 30 min | 45 min | 60 min | Notes |
| 5-5 | (E3) | 10 | 60 | — | 30 | — | ◉ | ◉ | ◉ | ◉ | ◉ | Ex. |
| 5-6 | (E1) | 10 | 50 | 20 | 20 | — | ◉ | ◉ | ◉ | ◉ | ◉ | Ex. |
| 5-7 | (E2) | 10 | 50 | 20 | 20 | — | ◉ | ◉ | ◉ | ◉ | ◉ | Ex. |
| 5-8 | (E3) | 1 | 55 | 22 | 22 | — | ◉ | ◉ | ○ | ○ | Δ | Ex. |
| 5-9 | (E3) | 2 | 54.4 | 21.8 | 21.8 | — | ◉ | ◉ | ○ | ○ | ○ | Ex. |
| 5-10 | (E3) | 5 | 52.8 | 21.1 | 21.1 | — | ◉ | ◉ | ◉ | ○ | ○ | Ex. |
| 5-11 | (E3) | 30 | 38.8 | 15.6 | 15.6 | — | ◉ | ◉ | ◉ | ◉ | ◉ | Ex. |
| 5-12 | (E3) | 40 | 33.4 | 13.3 | 13.3 | — | ◉ | ◉ | ◉ | ◉ | ◉ | Ex. |
| 5-13 | (E3) | 50 | 27.8 | 11.1 | 11.1 | — | ◉ | ◉ | ◉ | ◉ | ◉ | Ex. |
| 5-14 | (E3) | 16.7 | 83.3 | — | — | — | ◉ | ◉ | ◉ | ◉ | ◉ | Ex. |
| 5-15 | (E3) | 12.5 | 62.5 | — | 25 | — | ◉ | ◉ | ◉ | ◉ | ◉ | Ex. |

(Ratios of raw materials constituting power quick-setting admixture represent parts in 100 parts of the powder quick-setting admixture.)
Comp. Ex.: Comparative Example,
Ex.: Examples of the present invention From Table 5, it is evident that when the alkaline earth metal carbonate was used, the effect to prevent solidification of the slurry was obtained.

Example 6

A mortar was prepared by using cement having a blend ratio of cement/sand of 1/3 and W/C (water/cement ratio) of 50%, and a water-reducing agent in an amount of C (amount of cement)×1.0%. Relative to 100 parts of the cement in this mortar, 12 parts of a slurried quick-setting admixture for spraying (one having the powder quick-setting admixture and the liquid quick-setting admixture shown in Table 6, mixed in a mass ratio of 2:1) was mixed, and the mixture was packed into a framework. The protector penetration resistance value was measured at a test ambient temperature of 20° C. The results are shown in Table 6.

Materials Used
  Cement: Ordinary portland cement, commercial product, specific gravity: 3.16
  Sand: River sand produced in Himekawa, Niigata prefecture, specific gravity: 2.62
  Water-reducing agent: Polycarboxylic acid type high performance water-reducing agent, commercial product
  Water: Tap water Measuring Method
  Protector penetration resistance value: Measured in accordance with JSCE D-102-1999 (measured at material ages of 5 minutes and 15 minutes).

TABLE 6

| Test No. | Liquid quick-setting admixture | Ratios of raw materials constituting powder quick-setting admixture | | | | Protector penetration resistance value (N/mm²) | |
|---|---|---|---|---|---|---|---|
| | | Alkaline earth metal carbonate | Calcium aluminate | Alkali metal sulfate | Calcium sulfate | 5 min | 15 min |
| 6-1 | (E3) | 1.0 | 55.0 | 22.0 | 22.0 | 22.7 | 35.6 |
| 6-2 | (E3) | 2.0 | 54.4 | 21.8 | 21.8 | 21.2 | 33.4 |
| 6-3 | (E3) | 5.0 | 52.8 | 21.1 | 21.1 | 19.5 | 31.2 |
| 5-3 | (E3) | 10.0 | 50.0 | 20.0 | 20.0 | 18.3 | 30.5 |
| 6-4 | (E1) | 10.0 | 50.0 | 20.0 | 20.0 | 9.4 | 15.3 |
| 6-5 | (E2) | 10.0 | 50.0 | 20.0 | 20.0 | 14.4 | 23.4 |
| 6-6 | (E3) | 30.0 | 38.8 | 15.6 | 15.6 | 15.2 | 27.6 |
| 6-7 | (E3) | 50.0 | 27.8 | 11.1 | 11.1 | 13.4 | 24.6 |
| 6-8 | (E3) | 60.0 | 22.2 | 8.9 | 8.9 | 11.6 | 16.4 |
| 6-9 | (E3) | 14.0 | 30.0 | 28.0 | 28.0 | 14.3 | 25.5 |
| 6-10 | (E3) | 12.0 | 40.0 | 24.0 | 24.0 | 16.3 | 28.2 |
| 6-11 | (E3) | 8.0 | 60.0 | 16.0 | 16.0 | 23.4 | 37.2 |
| 6-12 | (E3) | 6.0 | 70.0 | 12.0 | 12.0 | 28.5 | 36.5 |
| 6-13 | (E3) | 12.3 | 61.2 | 2.0 | 24.5 | 19.7 | 32.2 |
| 6-14 | (E3) | 11.9 | 59.3 | 5.0 | 23.8 | 21.2 | 34.4 |
| 6-15 | (E3) | 8.8 | 43.7 | 30.0 | 17.5 | 17.2 | 30.3 |
| 6-16 | (E3) | 6.3 | 31.2 | 50.0 | 12.5 | 14.0 | 26.2 |
| 6-17 | (E3) | 11.9 | 59.3 | 23.8 | 5.0 | 24.4 | 33.2 |
| 6-18 | (E3) | 11.3 | 56.2 | 22.5 | 10.0 | 23.2 | 34.8 |
| 6-19 | (E3) | 8.8 | 43.7 | 17.5 | 30.0 | 21.2 | 29.1 |
| 6-20 | (E3) | 7.5 | 37.5 | 15.0 | 40.0 | 15.4 | 26.1 |
| 6-21 | (E3) | 9.0 | 45.0 | 18.0 | 18.0 | 21.4 | 34.4 |

(Ratios of raw materials constituting power quick-setting admixture represent parts in 100 parts of the powder quick-setting admixture. In Test No. 6-21, 10.0 parts of calcium hydroxide is further contained in power admixture.)

From Table 6, it is evident that excellent quick-setting properties were obtained by using proper amounts of an alkaline earth metal carbonate, calcium aluminate, an alkali metal sulfate and calcium sulfate in the power admixture.

Example 7

A test was carried out in the same manner as in Example 6 except that evaluation was carried out by using the liquid quick-setting admixture (E3) and the powder admixture of Test No. 5-3 in Example 5, and using the slurried quick-setting admixture for spraying in the ratio shown in Table 7. The results are shown in Table 7.

TABLE 7

| | Mixing ratio | | Protector penetration resistance value (N/mm$^2$) | | |
| --- | --- | --- | --- | --- | --- |
| Test No. | Liquid quick-setting admixture | Power admixture | 5 min | 15 min | Notes |
| 7-1 | 100 | 0 | 4.9 | 9.7 | Comp. Ex. |
| 7-2 | 95 | 5 | 7.1 | 13.6 | Ex. |
| 7-3 | 90 | 10 | 9.9 | 15.7 | Ex. |
| 5-3 | 67 | 33 | 18.3 | 30.5 | Ex. |
| 7-4 | 50 | 50 | 20.3 | 32.2 | Ex. |
| 7-5 | 30 | 70 | 16.7 | 26.7 | Ex. |

(The mixing ratio represents a mass ratio.)

From Table 7, it is evident that excellent quick-setting properties were obtained by adjusting the ratio of the liquid quick-setting admixture and the powder admixture to be proper by mass ratio.

Example 8

Using the liquid quick-setting admixture (E3) and the powder admixture of Test No. 5-3 in Example 5, a slurry was prepared by mixing in a ratio shown in Table 8, and the pH upon expiration of 1 minute from the mixing was measured by a litmus paper. The results are shown in Table 8.

Evaluation Method pH: The liquid quick-setting admixture and the powder admixture were mixed, and the pH after stirring for 1 minute was measured by means of a litmus paper manufactured by Toyo Roshi Kaisha, Ltd.

TABLE 8

| | Mixing ratio | | |
| --- | --- | --- | --- |
| Test No. | Liquid quick-setting admixture | Powder admixture | pH |
| 8-1 | 95 | 5 | 3 |
| 8-2 | 90 | 10 | 4 |
| 8-3 | 67 | 33 | 6 |
| 8-4 | 50 | 50 | 6 |
| 8-5 | 30 | 70 | 7 |

(The mixing ratio represents a mass ratio.)

From Table 8, it is evident that by adjusting the ratio of the liquid quick-setting admixture and the powder admixture to be proper by mass ratio, the pH upon expiration of 1 minute from the mixing of the liquid quick-setting admixture and the powder admixture, would be within a range of from 3 to 9.

Example 9

A test was carried out in the same manner as in Example 6 except that evaluation was carried out by using the quick-setting admixture for spraying obtained by mixing the liquid quick-setting admixture (E3) and the powder admixture of Text No. 5-3 in Example 5 in a mass ratio of 2:1, followed by slurrying, in an amount shown in Table 9 relative to 100 parts of the cement.

TABLE 9

| | | Protector penetration resistance value (N/mm$^2$) | |
| --- | --- | --- | --- |
| Test No. | Amount used | 5 min | 15 min |
| 9-1 | 5 | 3.2 | 5.5 |
| 9-2 | 8 | 6.4 | 10.9 |
| 5-3 | 12 | 18.3 | 30.5 |
| 9-3 | 15 | 28.4 | 41.2 |
| 9-4 | 25 | 36.2 | 50.3 |

(The amount used is the amount of the slurried quick-setting admixture for spraying used and represents parts per 100 parts of the cement.)

From Table 9, it is evident that excellent quick-setting properties were obtained by adding the quick-setting admixture.

Example 10

A mortar was prepared by using cement having a blend ratio of cement/sand of 1/3 and W/C (water/cement ratio) of 50%, and a water-reducing agent in an amount of C×1.0%. Relative to 100 parts of the cement in the mortar, the liquid quick-setting admixture (E3) and the powder admixture of Test No. 5-3 in Example 5 were mixed in a weight ratio of 2:1 and slurried. Then, 12 parts of the slurried quick-setting admixture for spraying was mixed, and the mixture was packed into a framework, then aged at a test ambient temperature of 20° C. for 1 day and then taken out from the framework to obtain a cured product. The obtained cured product was aged in water of 20° C. for 28 days and then dried for 7 days in an environment of 20° C. under relative humidity of 60%. Then, an accelerated neutralization test was carried out. Further, for the purpose of comparison, the evaluation was carried out with respect to a cured product obtained by using only the liquid quick-setting admixture. The results are shown in Table 10.

Measuring Method

Accelerated neutralization test: The acceleration neutralization test was carried out in an environment at a temperature of 30° C. under relative humidity of 60% at a CO$_2$ concentration of 5%. At the prescribed material ages, the cured product to be subjected to the test (4×4×16 cm) was cut, and phenolphthalein was sprayed on the cut surface to ascertain the neutralized depth.

TABLE 10

| Test No. | Type of quick-setting admixture | Compression strength immediately before accelerated neutralization test (N/mm$^2$) | Neutralized depth (mm) | | | Notes |
| --- | --- | --- | --- | --- | --- | --- |
| | | | 2 weeks | 4 weeks | 8 weeks | |
| 10-1 | Liquid quick-setting admixture only | 49.7 | 4.3 | 7.5 | 13.1 | Comp. Ex. |
| 10-2 | Slurry quick-setting admixture | 45.7 | 3.6 | 6.1 | 9.8 | Ex. |

(Each quick-setting admixture was used in an amount of 12 parts to cement.)

From Table 10, it is evident that by using a slurried quick-setting admixture for spraying obtained by mixing the liquid quick-setting admixture and the powder admixture, the resistance against neutralization was improved.

From the foregoing Examples, the following is evident.

Namely, by using the quick-setting admixture for spraying of the present invention prepared by mixing the liquid quick-setting admixture and the powder admixture, it is possible to obtain a low dusting property and a quick-setting property higher than the conventional quick-setting admixture. In the slurried quick-setting admixture for spraying of the present invention, the liquid quick-setting admixture accelerates the hydration reaction of cement, and the powder admixture has a self-curing property. By using the two as mixed, it is possible to impart a quick-setting property more efficient than the conventional quick-setting admixture.

INDUSTRIAL APPLICABILITY

The present invention is excellent in the following respects and is useful, as a quick-setting admixture for spraying, in e.g. an underground space or in a tunnel.

(1) To prevent solidification of a quick-setting admixture slurried in a quick-setting admixture-adding tool.

(2) By using a liquid quick-setting admixture and a powder admixture as mixed, it is possible to obtain a quick-setting property higher than a conventional quick-setting admixture.

(3) As compared with a case where only a liquid quick-setting admixture is used, the neutralization resistance will be improved.

The entire disclosures of Japanese Patent Application No. 2006-304597 filed on Nov. 9, 2006 and Japanese Patent Application No. 2007-188759 filed on Jul. 19, 2007 including specifications, claims, drawings and summaries are incorporated herein by reference in their entireties.

The invention claimed is:

1. A slurry quick-setting admixture comprising water and a powder quick-setting admixture wherein said powder quick-setting admixture comprises 2 to 30 parts of an alkaline earth metal carbonate, a water-soluble acidic substance selected from the group consisting of aluminum sulfate, oxalic acid, and a combination thereof, calcium aluminate and an alkali metal sulfate.

2. The slurry quick-setting admixture according to claim 1, comprising calcium sulfate.

3. The slurry quick-setting admixture according to claim 1, comprising at least one of calcium hydroxide and aluminum hydroxide.

4. The slurry quick-setting admixture according to claim 1, further comprising a retarder.

5. A quick-setting cement concrete comprising the slurry quick-setting admixture according to claim 1, and cement concrete.

6. The slurry quick-setting admixture according to claim 1, comprising 3 to 50 parts of the water-soluble acidic substance, 20 to 70 parts of calcium aluminate and 2 to 30 parts of alkali metal sulfate, based on 100 parts of the admixture.

7. The slurry quick-setting admixture according to claim 6, comprising 5 to 20 parts of the alkaline earth metal carbonate, 5 to 40 parts of the water-soluble acidic substance, 35 to 60 parts of the calcium aluminate and 5 to 20 parts of the alkali metal sulfate, based on 100 parts of the admixture.

8. A spraying method comprising:
mixing water and a powder quick-setting admixture comprising 2 to 30 parts of an alkaline earth metal carbonate, a water-soluble acidic substance selected from the group consisting of aluminum sulfate, oxalic acid, and a combination thereof, calcium aluminate and an alkali metal sulfate;
forming a slurry quick-setting admixture;
mixing said a slurry quick-setting admixture with cement concrete;
forming a quick-setting cement concrete; and
spraying said a quick-setting cement concrete.

9. A spraying method comprising:
joining and mixing, in a slurrying nozzle, water transported in a water supply line and a powder quick-setting admixture transported in a powder quick-setting admixture supply line wherein said powder quick-setting admixture comprises 2 to 30 parts of an alkaline earth metal carbonate, a water-soluble acidic substance selected from the group consisting of aluminum sulfate, oxalic acid, and a combination thereof, calcium aluminate and an alkali metal sulfate;
forming a slurry quick-setting admixture;
introducing said a slurry quick-setting admixture via a slurry quick-setting admixture inlet port to a showering tube;
mixing said a slurry quick-setting admixture with cement concrete via slurry quick-setting admixture-adding holes;
forming a quick-setting cement concrete; and
spraying said a quick-setting cement concrete.

10. The spraying method according to claim 9, wherein the showering tube has a double structure comprising an outer tube and an inner tube wherein the inner tube has the slurry quick-setting admixture-adding holes.

11. The spraying method according to claim 9, wherein the powder quick-setting admixture comprises calcium sulfate.

12. The spraying method according to claim 9, wherein the powder quick-setting admixture comprises at least one of calcium hydroxide and aluminum hydroxide.

13. The spraying method according to claim 9, wherein the powder quick-setting admixture comprises a retarder.

14. A quick-setting admixture suitable for spraying, comprising a liquid quick-setting admixture that comprises aluminum sulfate, and a powder admixture comprising calcium sulfate, an alkaline metal sulfate, an alkali metal element, 2 to 50 parts of an alkaline earth metal carbonate and calcium aluminate.

15. The quick-setting admixture for spraying according to claim 14, wherein the liquid quick-setting admixture comprises a compound having a fluorine element.

16. The quick-setting admixture for spraying according to claim 14, comprising, in 100 parts of the powder admixture, from 5 to 30 parts of the alkaline earth metal carbonate, from 30 to 70 parts of calcium aluminate, from 2 to 50 parts of the alkali metal sulfate and from 5 to 40 parts of calcium sulfate.

17. The quick-setting admixture for spraying according to claim 14, wherein the ratio of the liquid quick-setting admixture to the powder admixture is from 95:5 to 30:70 by mass ratio.

18. The quick-setting admixture for spraying according to claim 14, wherein the liquid quick-setting admixture and the powder admixture are mixed in a slurry form.

19. The quick-setting admixture for spraying according to claim 14, wherein the quick-setting admixture has a pH of from 3 to 9 upon expiration of one minute after mixing the liquid quick-setting admixture and the powder admixture.

20. A spraying material comprising cement, an aggregate and the quick-setting admixture for spraying according to claim 14.

21. The spraying material according to claim 20, wherein the amount of the quick-setting admixture for spraying comprising the liquid quick-setting admixture and the powder admixture, is from 5 to 25 parts, per 100 parts of the cement.

22. A spraying method, comprising spraying the spraying material according to claim 20.

* * * * *